July 7, 1936.     E. J. KINGSBURY     2,046,917
BELT DRIVE
Filed June 27, 1933
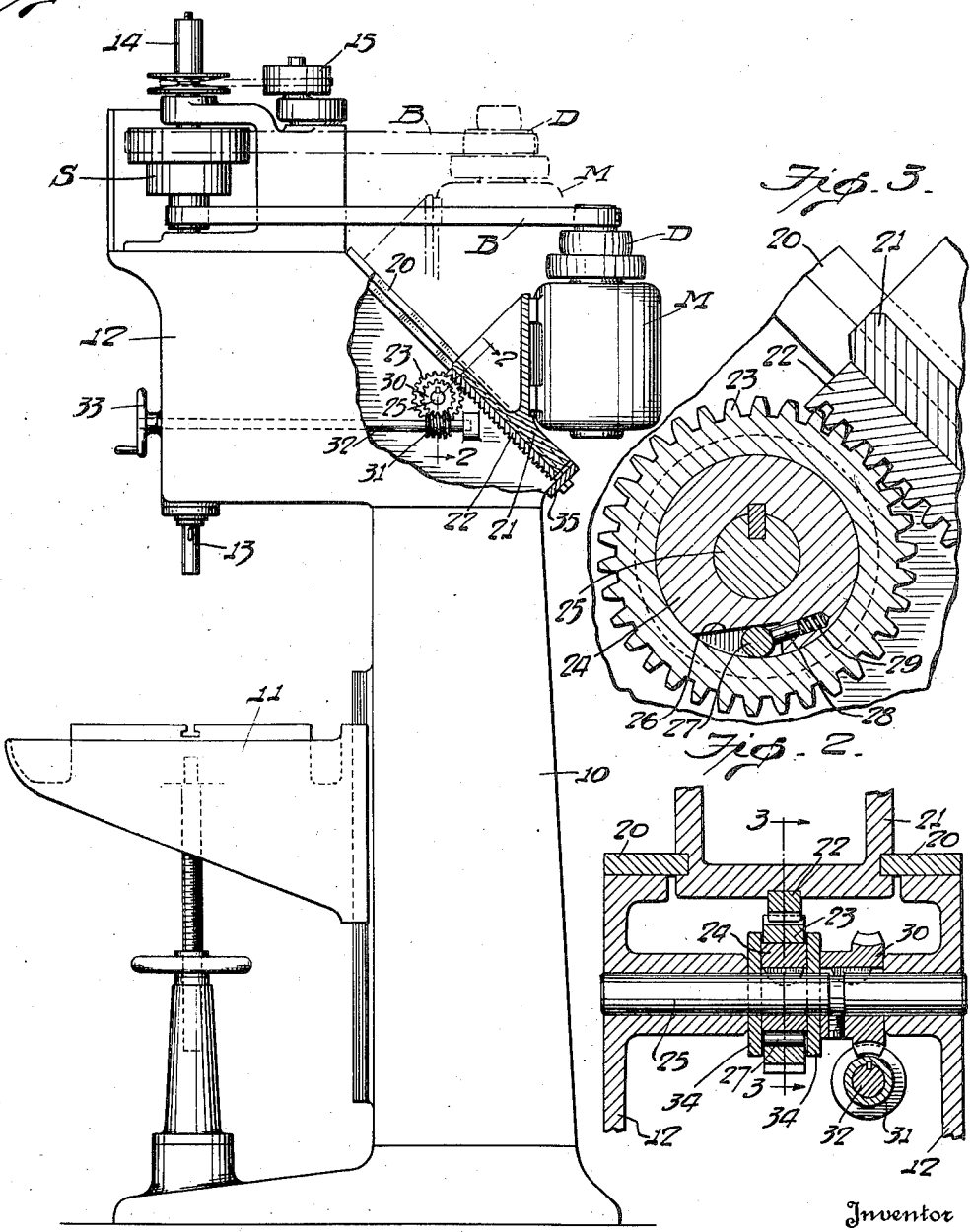
Inventor
Edward J. Kingsbury
By    Southard Mason & Porter
Attorneys Patented July 7, 1936

2,046,917

UNITED STATES PATENT OFFICE 2,046,917

BELT DRIVE

Edward Joslin Kingsbury, Keene, N. H.

Application June 27, 1933, Serial No. 677,953

7 Claims. (Cl. 74—217)

This invention relates to improvements in belt driving systems, and is especially valuable in belt drives in which two step or cone pulleys are mounted with vertical axes and connected by a belt for obtaining varying speed ratios.

One feature of the present invention is the provision of a structure in which each step of the driving pulley may be connected with any step of the driven pulley.

Another feature of the present invention is the provision of means for maintaining a substantially constant belt tension regardless of the pulleys which are connected together by the belt.

A further feature of the present invention is the incorporation of means to prevent the employment of an excessive belt tension.

With these and other objects in view, as will appear in the course of the following specification and claims, an illustrative form of practicing the invention is shown on the accompanying drawing, in which:

Figure 1 is an elevational view, partly broken away to show a drill press having a belt drive of the present type.

Figure 2 is a sectional view, on a larger scale, substantially on line 2—2 of Figure 1.

Figure 3 is a further sectional view, on a still larger scale, substantially on line 3—3 of Figure 2.

The invention is shown illustratively as employed on a drill press having column 10 with an adjustable knee 11 and a head 12 in which is mounted the drill spindle 13 to which is connected a step or cone pulley S. The drill press is shown conventionally, and may have a spindle feed device 14 which can be operated by a belt from the spindle feed pulley 15.

This drill press is shown as having an inclined guide 20, upon which is slidably received a motor bracket 21 to which an electric driving motor M is fastened. The bracket 21 is provided with a rack 22 in mesh with a rack gear 23 which is formed as an annulus (Fig. 3) for rotation about a center or core piece 24 which is keyed to a shaft 25 mounted in the drill press head 12. The core 24 is cut away to provide a surface 26 which converges with respect to the internal periphery of the rack gear 23. A roller 27 is located in the notch between this internal peripheral surface and the surface 26, and is normally forced into engagement with these surfaces by a plunger 28 energized by a spring 29.

The shaft 25 (Fig. 2) also has keyed thereto a worm gear 30 which is in mesh with a worm 31 on a shaft 32 supported in the upper head and extending to the exterior thereof and having a hand wheel 33 by which it may be rotated.

The limit of downward sliding movement of bracket 21 with respect to the guide 20 is limited by a stop 35.

The motor M has a step or cone pulley D thereon. A belt B is used to connect individual steps of the pulleys S and D. Preferably the steps in pulley D are crowned for controlling the position of the belt B, while the steps of pulley S are cylindrical and of greater width than the belt and/or the steps of pulley D.

As shown in Figure 3, the center or core piece 24 may be made cylindrical, save for the notch providing the surface 26, and washers or cheek pieces 34 provided at its end faces, while the annulus of the rack gear 23 may be of lesser axial dimension for free movement about the center or core piece 24 between these washer or cheek pieces.

In operation, the motor M through its pulley D and belt B drives the spindle pulley S in the usual way. When the parts are in the position shown in full lines in Figure 1, the smallest steps on each pulley are connected. By moving the motor bracket 21 upwardly along its guide 20, the belt may be shifted to any desired steps of the two pulleys. Thus as shown in the dot-and-dash lines of Figure 1, the second step of pulley D is connected with the largest step of pulley S.

This upward movement of the motor bracket 21 is accomplished by rotating the hand wheel 33 so that the worm 31 turns the work wheel and thus the shaft 25 and center or core piece 24. This motion is in a counter-clockwise direction in Figure 3. The roller 27 engages between the internal surface of rack gear 23 and the surface 26 so that the rack gear turns with the center or core piece 24 and thus the rack 22 is moved upwardly and carries with it the bracket 21. The belt is then manually adjusted.

When the hand wheel 33 is left at a standstill, the motor bracket 21 remains fixed on the guide 20 by the reaction between the worm wheel 30 and worm 31.

When the belt has been placed on the desired steps, the hand wheel 33 is backed off. The motor bracket 21 descends by gravity as it is no longer held in position by the engagement at work wheel 30 and worm 31. Finally, when the weight of the motor bracket 21 and the motor M has lowered the latter so far as permitted by the belt B, further movement of the hand wheel 33 has no effect in causing a further downward movement of the motor bracket and associated parts, as the shaft 25 is now causing a movement of the center or core piece 24 in a clockwise direction, so that as the core piece tends to transfer power through roller 27, this roller moves into the deeper part of the notch (relatively toward the right in Fig. 3) against the action of spring 29, and thus no power is transmitted to the rack gear 23.

It is preferred to have the ratios of the steps in the cone pulleys such that lines drawn through the midpoints of each of the steps of the several pulleys have about the same angle to the pulley axes as the guide 20 has to the vertical. In this way, the belt engages with the several steps, in any arrangement, without substantial looseness. For example, when the spindle pulley steps were made 3.1, 6.2, and 9.3 inches in diameter; and the motor pulley steps were made 7.4, 5.25 and 3 inches in diameter, it is found that the required belt length for the engagement will vary from 69.32 to 69.50 inches, in a machine having substantially the proportions of that illustrated. It will be understood that this belt length is comprised of the distance between the axes of the spindle 30 and of the motor M, in part, and in part of the fractional peripheries of the pulley steps which are then engaged. With the particular construction illustrated, the motor M, having a speed of 1150 R. P. M., gave speeds from 2750 to 370 R. P. M. at the spindle 13.

The weight of the motor M and its bracket 21 causes this motor to slide along guide 20, and to determine the tension at which it is desired that the belt B should operate. This tension cannot be increased by operation of the hand wheel 33, as this hand wheel is ineffective for moving the rack gear 23 downward. At the same time, this hand wheel 33 may be operated to raise the motor, and to control its downward movement by gravity, and even to determine the lowest position to which it may sink.

Further, the minor variations of belt length required are compensated by the width of the steps of spindle pulley S in this illustration. A face on one step pulley is therefore provided with a crown for guiding the belt regardless of position in height of the motor M. The other pulley has wide faces, which may, for example, be three-quarters of an inch wider than the faces of the crown pulley. In the illustration, the spindle pulley S has faces which are cylindrical and wider than the crown faces of pulley D. In the particular illustration, also the guide 20 is shown as being at 45° to the vertical. Hence, upward and downward movement of the motor M and its bracket, along the guide 20, amounting to three-quarters of an inch will likewise change the center distance of the axes of the two pulleys by three-quarters of an inch and thus allow for an inch and a half variation in the belt. This variation in the belt, of course, may arise in part through the changes of the belt from one step to another, etc.; but also may arise through the usual stretching of the belt in practice.

In the form illustrated, the step pulleys S and D are inverse with respect to one another, that is, the largest step of one pulley is at the top and the largest step on the other pulley is at the bottom. Correspondingly thereto, in this particular illustrated form, the inclined surface of guide 20 is shown as constituting a plane located at a right angle to the common plane through the axes of pulleys S and D, and intersecting the axis of pulley S above the point of intersection with the axis of pulley D.

It is obvious that the invention may be employed in many ways without departing from the scope of the appended claims.

Having thus described the invention, what I claim as new and desire to secure by Letters Patent, is:—

1. A belt drive comprising a frame, a step pulley mounted on said frame for rotation about a fixed vertical axis, a guide on said frame inclined to the vertical, a member movable by gravity downward along said guide, a rack on said member, a step pulley mounted on said member for rotation about a vertical axis movable with said member, a belt selectively engageable with any step of said step pulley and any step of said inverse step pulley, a rack gear engaged with said rack, and means for rotating said rack gear in one direction whereby to raise said member along said guide and including an overrunning clutch, said overrunning clutch operating to prevent rotation of said rack gear by said rotating means in the opposite direction.

2. A belt drive comprising a frame, a step pulley mounted on said frame for rotation about a fixed vertical axis, a guide on said frame inclined to the vertical, a member movable by gravity downward along said guide, a rack on said member, a step pulley mounted on said member for rotation about a vertical axis movable with said member, a belt selectively engageable with any step of said step pulley and any step of said inverse step pulley, a rack gear engaged with said rack, an overrunning clutch for rotating said rack gear in one direction only, means including a worm wheel for rotating said clutch, and a worm engaged with said worm wheel, said worm and worm wheel cooperating with said clutch to hold said member against downward movement when said worm is at a standstill.

3. A belt drive comprising a frame, a step pulley mounted on said frame for rotation about a fixed axis, a guide on said frame inclined to said axis at an angle, a member movable along said guide, an inverse step pulley mounted on said member for rotation about a movable axis parallel to said fixed axis, and a belt selectively engageable with any step of said step pulley and any step of said inverse step pulley, each said pulley having the lines which pass through the centers of widths of each step thereof located at an angle to their axes substantially the same as said guide angle.

4. A belt drive comprising a frame, a first step pulley mounted on said frame for rotation about a fixed axis, a guide on said frame inclined to said axis, a member movable along said guide, an inverse step pulley mounted on said member for rotation about a movable axis parallel to said fixed axis, and a belt, said steps of said pulleys being of related diameters coordinated with the inclination of said guide so that, when the inverse step pulley is presented at a position with one step on one said pulley alined with a step of the other said pulley, said steps constituting an alined pair engaging the belt, the belt may be shifted from said alined pair to another alined pair without substantial compensative movement of said member along the guide, the movement of said member and inverse step pulley along the guide compensating for the relative change of diameter as said inverse step pulley presents in alinement a larger or smaller step for cooperation through the belt with a given step on said first step pulley.

5. A belt drive comprising a frame, a first step pulley mounted on said frame for rotation about a fixed axis, a guide on said frame inclined to said axis, a member movable along said guide, an inverse step pulley mounted on said member for rotation about a movable axis parallel to said fixed axis, and a belt, said steps of said pulleys being of related diameters coordinated with the inclination of said guide so that, when the inverse step pulley is presented at a position with one step on one said pulley alined with a step of the other said pulley said steps constituting an alined pair engaging the belt, the belt may be shifted from said alined pair to another alined pair without substantial compensative movement of said member along the guide, the movement of said member and inverse step pulley along the guide compensating for the relative change of diameter as said inverse step pulley presents in aliement a larger or smaller step for cooperation through the belt with a given step on said first step pulley, one of said pulleys having its steps of greater width than the steps of the other said pulley so that compensative movement of the member along the guide permits continued engagement of the belt with the steps of an alined pair.

6. A belt drive comprising a frame, a first step pulley mounted on said frame for rotation about a fixed axis, a guide on said frame inclined to said axis, a member movable along said guide, an inverse step pulley mounted on said member for rotation about a movable axis parallel to said fixed axis, and a belt, said steps of said pulleys being of related diameters coordinated with the inclination of said guide so that, when the inverse step pulley is presented at a position with one step on one said pulley alined with a step of the other said pulley said steps constituting an alined pair engaging the belt, the belt may be shifted from said alined pair to another alined pair without substantial compensative movement of said member along the guide, the movement of said member and inverse step pulley along the guide compensating for the relative change of diameter as said inverse step pulley presents in alinement a larger or smaller step for cooperation through the belt with a given step on said first step pulley, one of said pulleys having its steps crowned, and the other said pulley having its steps cylindrical and of greater width than the steps of the other said pulley so that compensative movement of the member along the guide permits continued engagement of the belt with the steps of an alined pair.

7. A belt drive comprising a frame, a step pulley mounted on said frame for rotation about a fixed vertical axis, a guide on said frame inclined to the vertical, a member movable by gravity downward along said guide, an inverse step pulley mounted on said member for rotation about a movable vertical axis, a belt selectively engageable with any step of said step pulley and any step of said inverse step pulley, and means for raising said member along said guide, said raising means including devices for automaticaly disconnecting the drive therethrough so that the means cannot be operated to effect a positive downward pressure upon the member thereby in addition to the gravity forces thereon.

EDWARD JOSLIN KINGSBURY.